United States Patent [19]

Sheer et al.

[11] 4,181,704

[45] Jan. 1, 1980

[54] PROCESS FOR THE REMOVAL OF SULFUROUS GASES FROM THE EMISSIONS OF CHEMICAL PROCESSES

[75] Inventors: Charles Sheer, Teaneck, N.J.; Samuel Korman, Hewlett, N.Y.; Gerson S. Schaffel, Belmont, Mass.

[73] Assignee: Sheer-Korman Associates, Inc., New York, N.Y.

[21] Appl. No.: 969,204

[22] Filed: Dec. 13, 1978

Related U.S. Application Data

[63] Continuation-in-part of Ser. No. 818,399, Jul. 25, 1977, abandoned.

[51] Int. Cl.² ............................ C01B 17/16; B01D 53/34
[52] U.S. Cl. .................................... 423/230; 423/244
[58] Field of Search ................. 423/230, 244; 204/164

[56] References Cited

U.S. PATENT DOCUMENTS

4,018,868  4/1977  Knight ............................. 423/244

FOREIGN PATENT DOCUMENTS

396969  8/1933  United Kingdom ..................... 423/242

*Primary Examiner*—O. R. Vertiz
*Assistant Examiner*—Thomas W. Roy
*Attorney, Agent, or Firm*—Hammond & Littell

[57] ABSTRACT

A process for removing sulfurous by-product materials from high temperature reaction products of chemical processes consisting essentially in:

(1) passing a simple or complex metal oxide in the form of a coarsely divided powder entrained in a conveying gas through a high energy transfer zone whereby said powder is heated to a degree sufficient to vaporize said powder and said powder is substantially vaporized to form a hot effluent stream of metal oxide vapor, (2) injecting said hot effluent stream of metal oxide vapor into a gaseous reaction product, including sulfurous by-product materials, from an elevated temperature chemical process, (3) allowing said metal oxide vapor to condense to solid particles with reaction with said sulfurous by-product materials to fix the sulfur content thereof in the form of solid particles, and (4) separating said solid particles containing substantially all of the sulfur content of said sulfurous by-product materials from said gaseous reaction product.

9 Claims, 2 Drawing Figures

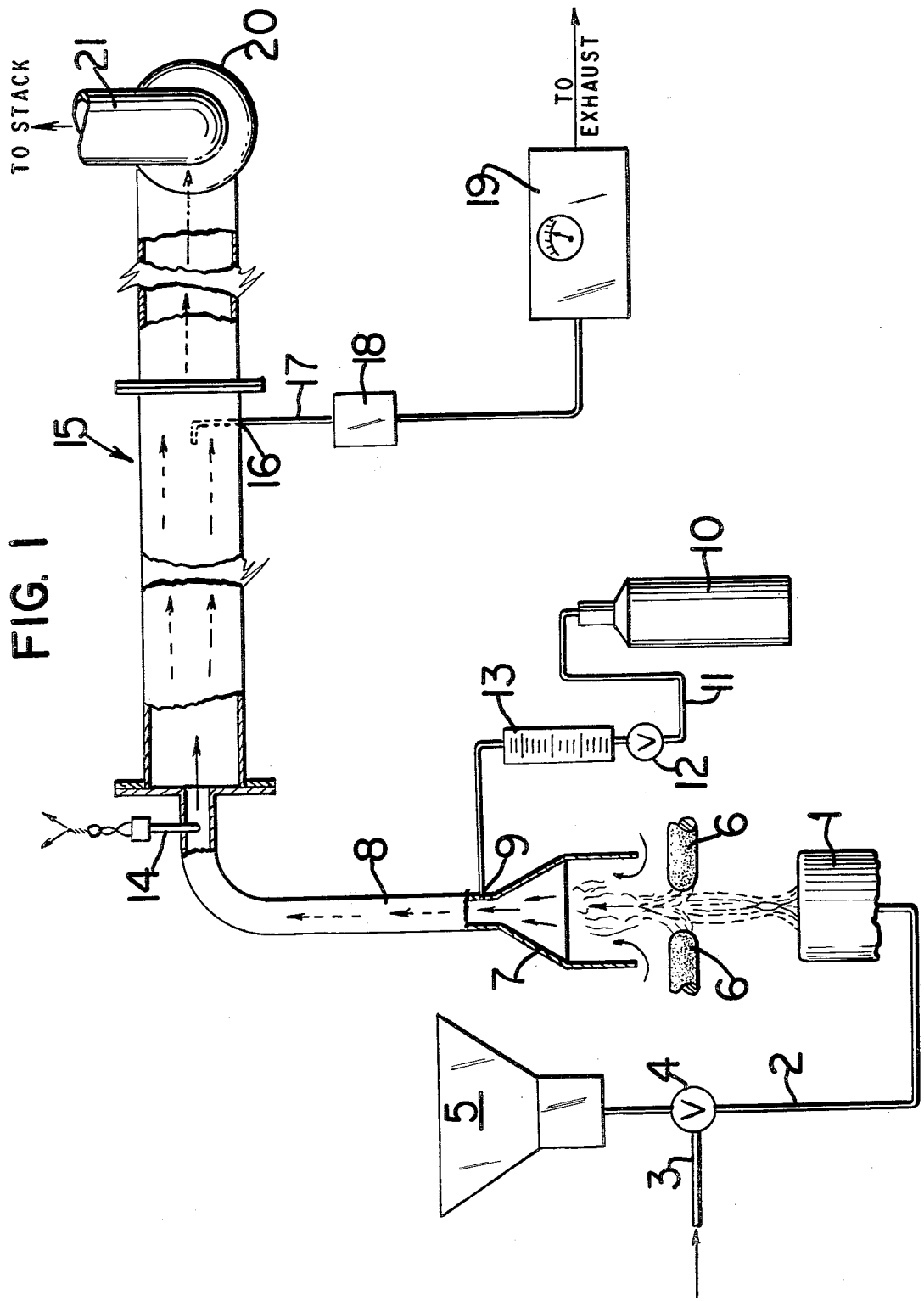

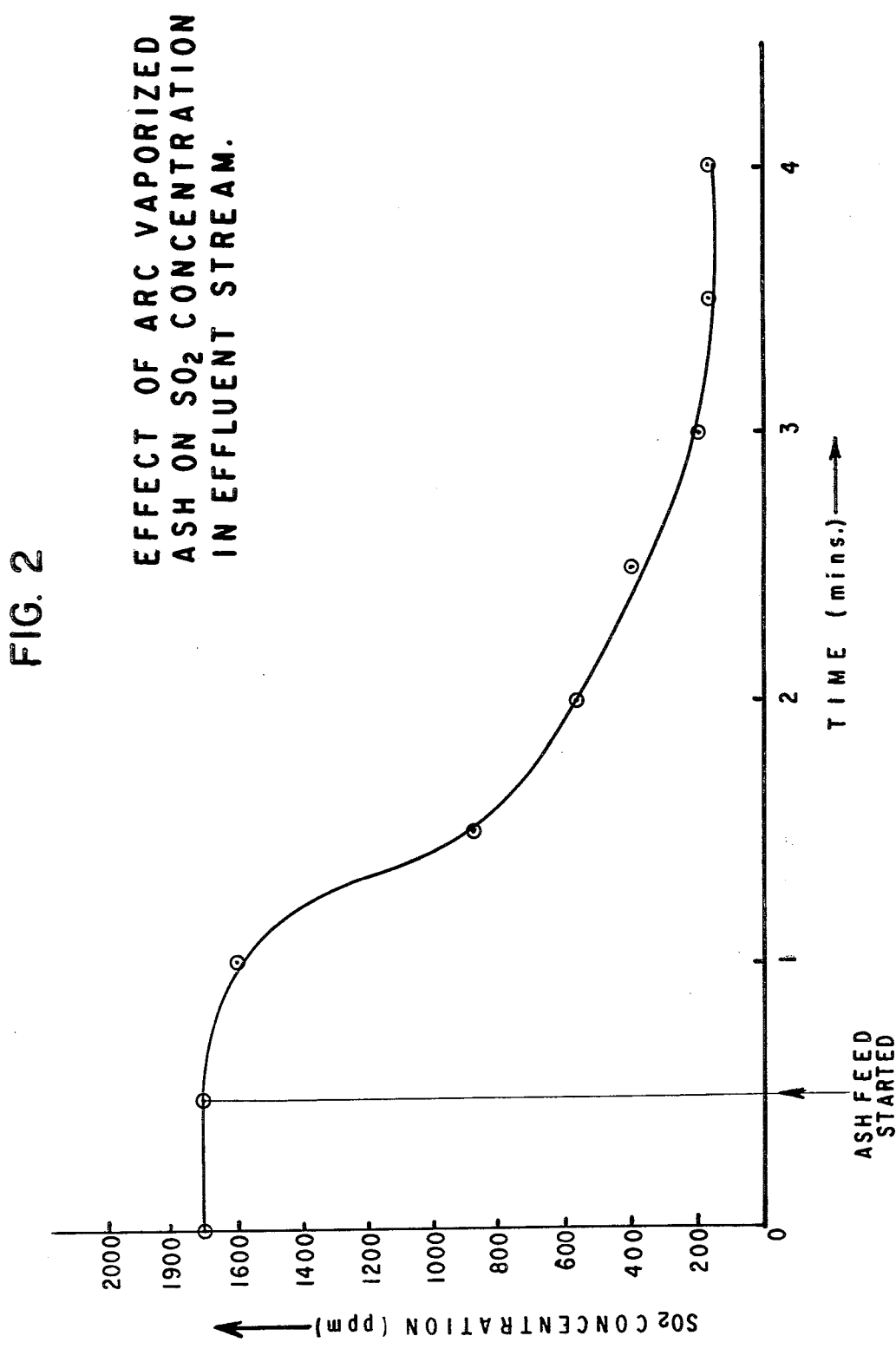

PROCESS FOR THE REMOVAL OF SULFUROUS GASES FROM THE EMISSIONS OF CHEMICAL PROCESSES

REFERENCE TO PRIOR APPLICATION

This is a continuation-in-part of patent application Ser. No. 818,399, filed July 25, 1977, now abandoned.

BACKGROUND OF THE INVENTION

This invention relates to a process for removing sulfurous by-product gaseous effluent from streams such as the stack gas emissions from elevated temperature chemical processes.

Sulfurous gases are presently a major atmospheric pollutant. Many elevated temperature chemical processes result in effluent gases containing sulfurous materials as by-products of the reaction. Such sulfur-containing gases are present at the output of many industrial processes, particularly those which utilize coal, oil or other fossil fuels as raw materials. Removal of the sulfur content from the output of such processes, or its reduction to environmentally acceptable levels has thus far proven to be economically prohibitive.

On the other hand, the presence of sulfurous gases in the effluents of many important industrial processes can be highly deleterious. If vented directly to a stack, they cause atmospheric pollution which becomes objectionable when such gases are present in the stack in a concentration greater than a few hundredths of one percent. Often the process effluent is used to feed another process in which practical yields require the use of catalysis. Sulfurous gases, even in small percentages, are notorious for their tendency to poison catalysts. For such processes the removal of sulfurous gases prior to contact with the catalyst is essential.

In order to avoid problems with sulfurous gas emissions, the current practice is to utilize purified feedstocks from which the sulfur content has been partially to substantially totally removed, or to utilize a chemical scrubber plant to remove sulfur-containing gases directly from the effluent. Both solutions, however, involve major costs and constitute a serious drawback to the use of sulfur-containing raw materials. Examples of some industrial processes for which sulfur impurities are difficult or impossible to avoid either in the process feed or in stack emissions, are presented in Table I.

TABLE I

| Type of Reaction | Catalyst | Type of Atmosphere | Type of Gaseous Compound |
| --- | --- | --- | --- |
| 1) Water-gas reaction with coal feed:<br>$C + H_2O \rightarrow CO + H_2$ | — | Reducing | $H_2S$, COS, $CS_2$<br>From the sulfur content of the coal |
| 2) Fischer-Tropsch reaction:<br>$2H_2 + CO \rightarrow CH_3OH$ | Raney nickel | Reducing | $H_2S$ Impurity in feed gas |
| 3) Steam shift reaction:<br>$CO + H_2O \rightarrow H_2 + CO_2$ | Platinum | Reducing | $H_2S$ Impurity in feed gas |
| 4) Methanation:<br>$2H_2 + 2CO \rightarrow CH_4 + CO_2$ | Raney nickel | Reducing | $H_2S$ Impurity in feed gas |
| 5) Coal combustion for steam generation:<br>$C + O_2 \rightarrow CO_2$ | — | Oxidizing | $SO_2$ Emission from the sulfur content of the coal |
| 6) Roasting of sulfide ores:<br>$Cu_2S + 2O_2 \rightarrow 2CuO + SO_2$ | — | Oxidizing | $SO_2$ Emission |

OBJECTS OF THE INVENTION

An object of the present invention is the development of an inexpensive method to remove sulfurous by-product constituents from the gaseous emission of elevated temperature chemical processes.

Another object of the present invention is the development of a process for removing sulfurous by-product gases from high temperature reaction products of chemical processes consisting essentially in:

(1) passing a simple or complex metal oxide in the form of a coarsely divided powder entrained in a conveying gas through a high energy transfer zone whereby said powder is subjected to temperatures sufficient to vaporize said powder and said powder is vaporized to form a hot effluent stream containing metal oxide vapor, (2) injecting said hot effluent stream containing metal oxide vapor into a gaseous reaction product, including sulfurous by-product gases, from an elevated temperature chemical process, (3) allowing said metal oxide vapor to condense to solid particles with reaction with said sulfurous by-product gases, thereby fixing the sulfur content in the form of solid particles, and (4) separating said solid particles containing substantially all of said sulfur content from said gaseous reaction product.

These and other objects of the present invention will become more apparent as the description thereof proceeds.

THE DRAWINGS

FIG. 1 is a flow diagram of one process of the invention.

FIG. 2 is a graph of the effect of arc vaporized ash on the $SO_2$ concentration in the effluent stream.

DESCRIPTION OF THE INVENTION

We have now found a method of desulfurizing the gaseous process effluents from elevated temperature chemical processes which is both practical and efficient, and which is far less costly than conventional scrubbers. In essence, this method consists of injecting into the sulfur-containing gas stream the effluent of a high energy transfer zone, such as an electric arc device, to which is fed a convenient carrier gas with entrained solids of a particular kind. These consist of either simple metal oxides or more complex derivatives thereof, e.g. metal silicates or multiple oxides representing combinations of two or more simple oxides.

More particularly, the present invention involves a process for removing sulfurous by-product materials from the high temperature reaction products of chemical processes consisting essentially in:

(1) passing a simple or complex metal oxide in the form of a coarsely divided powder entrained in a convenient conveying gas through a high energy transfer zone whereby said powder is subjected to temperatures sufficiently high to vaporize said powder and said powder is substantially completely vaporized to form a hot effluent stream containing metal oxide vapor, (2) injecting said hot effluent stream containing metal oxide vapor into a gaseous reaction product, including sulfurous by-product gases, from an elevated temperature chemical process, (3) allowing said metal oxide vapor to condense to ultrafine, reactive solid particles which then combine with said sulfurous by-product gases, thereby fixing the sulfur content in the form of solid particles, and (4) separating said solid particles containing substantially all of said sulfur content from said gaseous reaction product.

In order to carry out this process, it is necessary merely to inject into the process reactor and/or the effluent duct from the process reactor, a jet of a hot effluent stream containing metal oxide vapor, the latter being derived by entraining a relatively coarse powder of either simple or complex metal oxides, entrained in a suitable working gas, such as air, CO, and/or $H_2$ etc., and injecting said entrained coarse powder into and through a high energy heat transfer zone, e.g., an induction furnace, a solar furnace, a resistance furnace, arc plasma generator, etc., whereby said entrained coarse powder, if of a complex molecular composition is decomposed into simple oxides, and said simple oxides are vaporized at temperatures usually in excess of 2000° K. to form a hot effluent jet. The oxide vapor is then allowed to condense into an ultra-fine, highly reactive fume inside the process reactor or duct therefrom where the ambient temperature and other conditions favor a reaction between the oxide fume and the sulfur gases, forming thereby solid particles of metal sulfides, sulfites or sulfates, as the case may be, which solid particles are thereafter removed from the gas stream by conventionally known means, such as bag filters, agglomerator and cyclone, electrostatic precipitator, etc.

Owing to the treatment of the sulfur fixing oxides to very high temperatures, generally in excess of 2000° K. and preferably higher temperatures, for example, >2500° K., it becomes possible to utilize almost any type of metal oxide including waste mineral material. Preferably, the metal oxides are alkaline earth metal oxides or oxides of heavier metals than alkaline earth metals. While alkali metal oxides, such as lithium oxide, sodium oxide or potassium oxide, may be employed in the process of the invention, they are extremely corrosive to the metal walls of the equipment at the temperatures involved, and are therefore to be avoided. Of course, where a complex metal oxide or silicate is employed, such as clay, particularly clays of the montmorillonite type, a content of alkali metal oxides of up to 7% can be present without effecting corrosion of the equipment walls. Preferably, therefore, the simple or complex metal oxides employed as starting materials according to the invention are metal oxides selected from the group consisting of alkaline earth oxides, oxides of metals having the same or higher valence than alkaline earth metals, and complex metal oxides and silicates containing less than 7% by weight of alkali metal oxides. It is to be understood that compounds containing silicates can also be considered as complex metal oxides, since, when vaporized, the $SiO_2$ formed is in the form of a finely-divided fume which, while non-reactive to sulfur containing gases, assists in the removal of sulfur containing gases by reason of its high surface adsorption.

One of the most effective ways of obtaining this hot effluent stream containing metal oxide vapor is to employ the methods and device described in our prior U.S. Pat. Nos. 3,644,781 and 3,644,782. These patents disclose the device and process for energizing a fluid medium containing an entrained condensed phase, such as a powder of a simple or complex metal oxide, by means of an arc discharge between an anode and a cathode having a conical tip, said arc discharge forming a contraction of the current-carrying area in the transition region in the vicinity of said cathode, the points of inflection of said contraction of the current-carrying area forming, when extended, an angle $\alpha$, which comprises forcefully projecting a fluid medium along said conical tip of said cathode into and through said contraction of the current-carrying area in the transition region in the vicinity of said cathode at a mass flow density at substantially constant convection rate which is at least sufficient to effect a rise in the temperature of said arc column at a constant current level and below a total fluid medium convection rate at substantially constant mass flow density which is sufficient to reduce the angle $\alpha$ below 40° at a constant current level, and adding a finely dispersed nongaseous medium capable of causing an enlargement in the angle $\alpha$ to said fluid medium forcefully projected along said conical tip at a total fluid medium convection rate at substantially constant total mass flow density which is below that sufficient to reduce said enlarged angle $\alpha$ below 40° at a constant current level. This process is commonly called a forced convection cathode.

When conducting the presently claimed process utilizing the device and methods of U.S. Pat. No. 3,644,781, it is important that the entrained condensed phase of a powder of a simple or complex metal oxide be made to penetrate the central core of the arc column as completely as possible, so as to be caused thereby to become vaporized and, if applicable, broken down into two or more simple oxides, before exiting from the arc discharge. This type of treatment has been shown (U.S. Pat. No. 3,644,781) to be effective in vaporizing the major portion of the solid feed when properly injected into the conduction column of the arc.

When metal oxides are so vaporized, they condense very rapidly into a fume upon leaving the arc discharge. It is on the peculiar physical and chemical properties of this fume that the sulfur fixing capability of the claimed process depends. For example, refractory materials, such as most metal oxides, after being vaporized in an electric arc, condense into ultra-fine particles with sizes typically in the range of 100 to 1000, preferably 150 to 900, Angstrom units. Thus a small quantity of such solids becomes possessed of an enormous surface area, typically in the range of 50 to 300 square meters per gram. Such large surface area provides for effective absorption of a gaseous constituent of a gas stream into which the fume is dispersed. Secondly, when the arc feed consists of complex compounds, such as clay or shale, the process of vaporization causes chemical breakdown of the complex molecules. Further, the extremely rapid rate of refractory vapor condensation in the arc effluent favors recombination in the form of chemically reactive simple oxides, as illustrated for the case of feldspar:

$$K_2O \cdot Al_2O_3 \cdot 6SiO_2 \rightarrow K_2O + Al_2O_3 + 6SiO_2$$

Feldspar, however, contains about 17% by weight of potassium oxide and has, therefore, an unduly high content of an alkali metal oxide to be used effectively in the process of the invention.

While the complex silicate molecule is quite stable and will not react with sulfur gases at the common processing temperatures (e.g., 1000° F. to 3000° F.), the simple oxides, such as CaO and $Al_2O_3$, and indeed a large variety of other oxides, including those of the alkali and alkaline earth metals, react rapidly with sulfur gases at these temperatures. Finally the rapid condensation of the super-cooled vapors issuing from the arc of column causes the particles to congeal with highly active surface properties, such that even normally non-reactive materials, such as $SiO_2$, become effective in surface adsorption and are capable of assisting in removing sulfur gases from a process stream.

It should be emphasized that the above-described properties, namely, ultra-fine particle size, high chemical reactivity and enhanced surface adsorptivity, are characteristic of vaporized materials only, and, more particularly, of materials vaporized in a high energy transfer zone, such as an electric arc.

It is believed that the desulfurizing action, which has been observed in the effluents of reactions involving coal or petroleum feed stocks are principally due to chemical reactions between metal oxide compounds, in an ultra-fine reactive state and the sulfurous gases in the effluent. These are illustrated by the following reactions for both reducing and oxidizing atmospheres:

(1) Reducing atmosphere (sulfurous gas - $H_2S$)

$$H_2S + MeO \rightarrow MeS \downarrow + H_2O$$

(2) Oxidizing atmosphere (sulfurous gas - $SO_2$)

$$SO_2 + MeO + \tfrac{1}{2}O_2 \rightarrow MeSO_4 \downarrow$$

where "Me" stands for any metal, assumed here to be bivalent.

In both illustrations a sulfurous gas reacts with a metal oxide to produce a sulfur compound which is a solid at the prevailing reaction temperatures. The solid sulfur compounds are then removed from the gas stream by conventional means, e.g., a bag house or electrostatic precipitation.

Among the desulfurization processes at present under investigation is the use of fully calcined limestone or dolomite to react with $H_2S$ or $SO_2$, in accordance with reactions (1) or (2) above, where Me stands for Ca for limestone and Ca or Mg for dolomite. These oxides, for example, in a finely comminuted state, are used in a fluidized bed combustor together with high sulfur coal for power generation. Temperatures in the firebox of the steam boilers are typically in the range of 2000° F. to 2300° F. For these conditions, with calcined limestone and excess air, reaction (2) proceeds and the amount of $SO_2$ fixed as $CaSO_4$ is sufficient to reduce the residual $SO_2$ in the stack to acceptable levels (<200 PPM). However, the kinetics of this reaction in the operating range of temperatures is such that satisfactory desulfurization requires large amounts of lime to be processed per ton of coal burned, and involves plant equipment of major proportions and high capital cost.

It is also pointed out that the finely-comminuted oxides employed have particle sizes which are $10^2$ to $10^3$ times greater than the fume condensate of the vaporized material of the present invention.

On the other hand, arc vaporized lime injected into the firebox of a conventional pulverized coal burner is effective in reacting with the $SO_2$ at the same temperature with considerably greater speed, owing to the extremely fine particle size and high degree of reactivity of the arc vaporized material, so that virtually quantitative conversion of $SO_2$ to $CaSO_4$ will occur during the normal residence time of the gases in the firebox. As a consequence, the amount of lime used to desulfurize is reduced and, more importantly, the size and cost of the auxiliary desulfurization equipment is greatly decreased.

The simple or complex metal oxides employed in the process of the invention can be any type as indicated above. When desulfurizing the combustion gases from the burning of a high sulfur coal, a waste mineral matter in the form of coal ash can be employed for this purpose. Coal ash generally consists of clays and shale, which are inert as sulfur absorbents. In the high temperature zone, however, the stable complex silicates are decomposed into reactive simple oxides which then become effective in sulfur gas removal. Thus a waste material is available at the site as the feed for producing the absorber, lowering process cost considerably. Also the waste disposal problem is not aggravated, as is the case when large amounts of limestone or dolomite have to be transported to and from the site.

The following specific embodiment illustrates the practice of the invention without being limitative in any manner.

EXAMPLE

DESULFURIZATION PROCESS

The apparatus was assembled as shown in FIG. 1. The fluid convection cathode 1 is a double-shrouded cathode as disclosed in our U.S. Pat. No. 3,900,762. This is fed through line 2 by an oxide powder entrained in a carrier gas. The carrier gas is passed from line 3 through the mixer valve 4 where oxide powder from the feeder 5 is mixed with the carrier gas. The positive terminus is three anodes 6 consisting of fluid transpiration anodes as described in our U.S. Pat. No. 3,209,193, arranged symmetrically about an extension of the cathode axis as described in our U.S. Pat. No. 3,931,542. The hot effluent stream containing metal oxide vapors is collected in a cowl 7 and passed to a mixing area 8 together with $SO_2$ which is inserted at point 9 after passage from the $SO_2$ tank 10 through line 11, valve 12 and flowmeter 13. At the upper end of mixing area 8, the temperature is measured by a thermocouple 14. The effluent is then passed through a reactor section 15 where at a point 16 therein, a sample of the effluent gas is collected by line 17, filtered through a solids filter 18 and the $SO_2$ content is measured in a detector 19. A positive flow is maintained by the action of the blower 20 and the gases are then delivered to the stack 21.

The oxide powder used was the fly ash from a commercial coal-burning power generating station. This consists largely of complex silicates such as shale and clay, which contain a large percentage of suitable metal oxides. The ash was placed in the hopper of a vibratory powder feeder 5 and fed through a control valve 4 to the high energy transfer zone, which in this case consisted of the column of an electric arc. The type of arc system preferred for this application featured a double-shrouded fluid convection cathode (FCC) 1, as disclosed in U.S. Pat. No. 3,900,762. The positive terminus consisted of three fluid transpiration anodes (FTA) 6 (see U.S. Pat. No. 3,209,193) arranged symmetrically about the extension of the cathode axis, as disclosed in U.S. Pat. No 3,931,542.

The arc effluent, along with tempering air from the surrounding atmosphere, was drawn into a mixing sector 8 and reactor section 15, via a cowl 7 situated directly above the arc, by the action of a blower 20 downstream of the reactor section. The mixing section 8 consisted of four foot long by 2" ID stainless steel pipe. Sulfur dioxide gas was introduced into the mixing section 8 just downstream of the cowl 7 at point 9, the flow being controlled by valve 12 and measured by a flowmeter 13. The operation of the blower 20 was adjusted to pull approximately 40 cubic feet per minute of gas, the latter consisting of a mixture of the arc effluent and tempering air, plus the $SO_2$ introduced at point 9. The volume flow rate through the mixing section was adjusted to achieve an exit temperature of about 2200° F., as determined by a thermocouple 14 located at the end of the mixing section 8. The flow of $SO_2$ into the pipe at point 9 was adjusted relative to the amount of gas drawn into the cowl, so that the gas sampled at point 16 near the downstream end of the reactor section 15 read 1800 parts per million on the $SO_2$ detection meter 19.

Once the $SO_2$ flow was established, the arc was ignited and adjusted so that 70 grams per minute of argon were fed to the inner shroud and about 2 standard cubic feet per minute were fed to the outer shroud of the double-shroud fluid convection cathode 1. Simultaneously 15 grams per minute of argon were fed to each of the three porous FTA anodes 6. The arc gap was adjusted to 2-½ inches and the current and voltage were 600 amps (total) and 130 volts, respectively. Next the outer shroud argon was replaced with approximately 2.5 SCFM of air, following which the arc voltage rose to 160 volts.

As soon as the outer shroud argon was replaced by air, the $SO_2$ meter reading rose to about 2000 parts per million and then fell within a minute or two to about 1700 ppm, where it remained steady. The arc was maintained in this condition for 3 or 4 minutes while the temperature of the gas stream at 14 rose to a steady value of 2200° F. The $SO_2$ meter 19 continued to read 1700 ppm. Then the ash feeder was turned on and adjusted to feed 38 grams per minute of ash. This was entrained in the air stream fed into the FCC outer shroud. An incandescent effluent flame of vaporized ash components was immediately visible entering the cowl above the arc. After about a half minute the $SO_2$ meter 19 began to fall. Readings taken, starting with the instant the ash was fed to the arc, are plotted in the curve of FIG. 2. Within three minutes, the concentration of $SO_2$ in the gas sampled at point 16 dropped to less than 200 ppm. This low reading remained until the ash feed was stopped and the arc was turned off, after which the $SO_2$ reading rose again to a value of 1800 ppm.

This proves conclusively that arc vaporized ash is effective in removing substantially all of the $SO_2$ from a gas stream containing 1700 ppm of $SO_2$.

The preceding specific embodiment is illustrative of the practice of the invention. It is to be understood, however, that other expedients known to those skilled in the art or disclosed herein may be employed without departing from the spirit of the invention or the scope of the appended claims.

We claim:
1. A process for removing sulfurous by-product gases from high temperature reaction products of chemical processes consisting essentially in:
(1) passing a simple or complex metal oxide selected from the group consisting of alkaline earth oxides, oxides of metals having the same or higher valence than alkaline earth metals, and complex metal oxides and silicates containing less than 7% by weight of alkali metal oxides in the form of a coarsely divided powder entrained in a convenient conveying gas through a high energy transfer zone whereby said powder is subjected to temperatures in excess of 2500° K. and sufficiently high to vaporize said powder and said powder is substantially vaporized to form a hot effluent stream containing metal oxide vapor,
(2) injecting said hot effluent stream containing metal oxide vapor into a gaseous reaction product including sulfurous by-product gases, from an elevated temperature chemical process,
(3) allowing said metal oxide vapor to condense to ultrafine, reactive solid particles having a size in the range of 100 to 1000 Angstrom units, which then combine with said sulfurous by-product gases, thereby fixing the sulfur content in the form of solid particles, and
(4) separating said solid particles containing substantially all of said sulfur content from said gaseous reaction product.

2. The process of claim 1 wherein said high energy transfer zone is an electric arc.

3. The process of claim 2 wherein said electric arc employs a forced convection cathode.

4. The process of claim 1 wherein said elevated temperature chemical process is the combustion of coal.

5. The process of claim 1 wherein said elevated temperature chemical process is the roasting of metal sulfide ores.

6. The process of claim 1 wherein said metal oxides are components of ash derived from the combustion of coal.

7. The process of claim 1 wherein said metal oxides are components of slag derived from the smelting of sulfide ores.

8. A process for removing sulfurous by-product gases from high temperature reaction products of chemical processes consisting essentially in:
(1) passing a simple or complex metal oxide selected from the group consisting of alkaline earth oxides, oxides of metals heavier than alkaline earth metals, and complex metal oxides and silicates containing less than 7% by weight of alkali metal oxides in the form of a coarsely divided powder entrained in a convenient conveying gas through a high energy transfer zone, said high energy transfer zone being an electric arc employing a forced convection cathode, whereby said powder is subjected to temperatures in excess of 2500° K. and sufficiently high to vaporize said powder and said powder is substantially vaporized to form a hot effluent stream containing metal oxide vapor,
(2) injecting said hot effluent stream containing metal oxide vapor into a gaseous reaction product including sulfurous by-product gases, from an elevated temperature chemical process,
(3) allowing said metal oxide vapor to condense to ultrafine, reactive solid particles having a size in the range of 100 to 1000 Angstrom units and a surface area of from 50 to 300 square meters per gram which then combine with said sulfurous by-product gases, thereby fixing the sulfur content in the form of solid particles, and (4) separating said solid particles containing substantially all of said sulfur content from said gaseous reaction product.

9. The process of claim 8 wherein said metal oxides are components of ash derived from the combustion of coal.

* * * * *